United States Patent
Polese et al.

(10) Patent No.: US 9,036,866 B2
(45) Date of Patent: May 19, 2015

(54) IMAGE-BASED OCCUPANCY SENSOR

(71) Applicant: ALLIANCE FOR SUSTAINABLE ENERGY, LLC, Golden, CO (US)

(72) Inventors: Luigi Gentile Polese, Thornton, CO (US); Larry Brackney, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 173 days.

(21) Appl. No.: 13/752,101

(22) Filed: Jan. 28, 2013

(65) Prior Publication Data

US 2014/0211985 A1   Jul. 31, 2014

(51) Int. Cl.
*G06K 9/00* (2006.01)
*G06T 7/20* (2006.01)
*F24F 11/00* (2006.01)

(52) U.S. Cl.
CPC ........ *G06K 9/00362* (2013.01); *G06K 9/00771* (2013.01); *G06K 9/00221* (2013.01); *G06T 7/20* (2013.01); *F24F 11/0034* (2013.01)

(58) Field of Classification Search
None
See application file for complete search history.

(56) References Cited

U.S. PATENT DOCUMENTS

| | | | |
|---|---|---|---|
| 5,221,919 A | 6/1993 | Hermans | |
| 6,829,370 B1 | 12/2004 | Pavlidis et al. | |
| 7,940,300 B2 | 5/2011 | Spinelli | |
| 8,068,006 B2 | 11/2011 | Martin | |
| 8,218,024 B2 | 7/2012 | Kawata et al. | |
| 2005/0110637 A1 | 5/2005 | Rao | |
| 2011/0025852 A1 | 2/2011 | Tanaka | |
| 2011/0211110 A1 | 9/2011 | Doublet | |
| 2011/0254691 A1* | 10/2011 | Ooi et al. | 340/635 |
| 2012/0189164 A1 | 7/2012 | Feris et al. | |
| 2012/0251078 A1 | 10/2012 | Leichter et al. | |
| 2012/0287266 A1 | 11/2012 | Varekamp et al. | |
| 2012/0288165 A1 | 11/2012 | Bedros et al. | |
| 2013/0282420 A1* | 10/2013 | Paul et al. | 705/7.16 |
| 2014/0107846 A1* | 4/2014 | Li | 700/275 |

OTHER PUBLICATIONS

Ekwevugbe et al. "A Design Model for Building Occupancy Detection Using Sensor Fusion." 6th IEEE International Conference on Digital Ecosystems Technologies, Jun. 18, 2012, pp. 1-6.*

(Continued)

*Primary Examiner* — Jon Chang
(74) *Attorney, Agent, or Firm* — John C. Stolpa; Michael A. McIntyre; Suzanne C. Walts

(57) ABSTRACT

An image-based occupancy sensor includes a motion detection module that receives and processes an image signal to generate a motion detection signal, a people detection module that receives the image signal and processes the image signal to generate a people detection signal, a face detection module that receives the image signal and processes the image signal to generate a face detection signal, and a sensor integration module that receives the motion detection signal from the motion detection module, receives the people detection signal from the people detection module, receives the face detection signal from the face detection module, and generates an occupancy signal using the motion detection signal, the people detection signal, and the face detection signal, with the occupancy signal indicating vacancy or occupancy, with an occupancy indication specifying that one or more people are detected within the monitored volume.

20 Claims, 2 Drawing Sheets

(56) References Cited

OTHER PUBLICATIONS

Han et al. "Occupancy and Indoor Environment Quality Sensing." IEEE International Instrumentation and Measurement Technology Conference, May 13, 2012, pp. 882-887.*

Audin, L., "Ocupancy Sensors: Promise and Pitfalls," ESource TU-93-8, Aug. 1993.

Brackney et al., "Design and Performance of an Image Processing Occupancy Sensor," NREL TP-5500-52630 (2011).

Polese, L.G., "Image Processing Occupancy Sensor (IPOS) Enhanced Prototype Report," Boneville Power Administration, Energy Efficiency Emerging Technologies Initiative, Jul. 2012.

DiLouie, C., "Occupancy Sensors 101," Electrical Construction & Maintenance, http://ecmweb.com/print/lighting-amp-control/occupancy-sensors-101 (2007).

* cited by examiner

IMAGE-BASED OCCUPANCY SENSOR

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Building energy usage and energy usage efficiency are areas of increasing concern due to rising energy costs. Energy efficient building components and intelligent building operation can make a great difference in the cost of operating a building over the building's lifetime.

Past energy efficiency efforts have led to many improvements in building construction. As a result, energy reduction efforts have begun to focus on reducing energy consumption in operation. Operational building efficiency has been enabled through computerized control of building systems such as lighting, heating, cooling, and other ventilation operations. By controlling lighting according to occupancy of a room or other building areas, the electrical consumption can be optimized and reduced, wherein room lighting levels are reduced or turned off completely if a room is not occupied.

Occupancy detection has typically employed motion-detecting occupancy sensors, such as ultrasonic motion sensors. Although ultrasonic motion detectors are inexpensive, detecting motion as a surrogate for occupancy has drawbacks. Ultrasonic sensors have a limited range and lose accuracy with increasing distance. Ultrasonic sensors have difficulty in detecting a number of occupants. Worse, if occupants of a room do not exhibit motion, or do not exhibit gross motions that are detectable as motion, ultrasonic motion detectors are known for turning off lights when a room is still occupied.

What is needed, therefore, is an occupancy sensor that is not dependent on motion detection.

SUMMARY

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

An image-based occupancy sensor is provided according to an embodiment comprising a motion detection module that receives an image signal of a monitored volume comprising a sequence of image frames and processes the image signal to generate a motion detection signal, a people detection module that receives the image signal and processes the image signal to generate a people detection signal, a face detection module that receives the image signal and processes the image signal to generate a face detection signal, and a sensor integration module that receives the motion detection signal from the motion detection module, receives the people detection signal from the people detection module, receives the face detection signal from the face detection module, and generates an occupancy signal using the motion detection signal, the people detection signal, and the face detection signal, with the occupancy signal indicating vacancy or occupancy, with an occupancy indication specifying that one or more people are detected within the monitored volume.

An image-based occupancy sensing method is provided according to an embodiment comprising receiving an image signal of a monitored volume comprising a sequence of image frames, processing the image signal with a motion detection routine and generating a motion detection signal that indicates a presence or absence of motion in the image signal, processing the image signal with a people detection routine and generating a people detection signal that indicates a presence or absence of one or more people in the image signal, processing the image signal with a face detection routine and generating a face detection signal that indicates a presence or absence of one or more faces in the image signal, and generating an occupancy signal using the motion detection signal, the people detection signal, and the face detection signal, with the occupancy signal indicating vacancy or occupancy, with an occupancy indication specifying that one or more people are occupying the monitored volume.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in reference figures of the drawings. It is intended that the embodiments and figures disclosed herein are to be considered illustrative rather than limiting.

DETAILED DESCRIPTION

Figure 1:
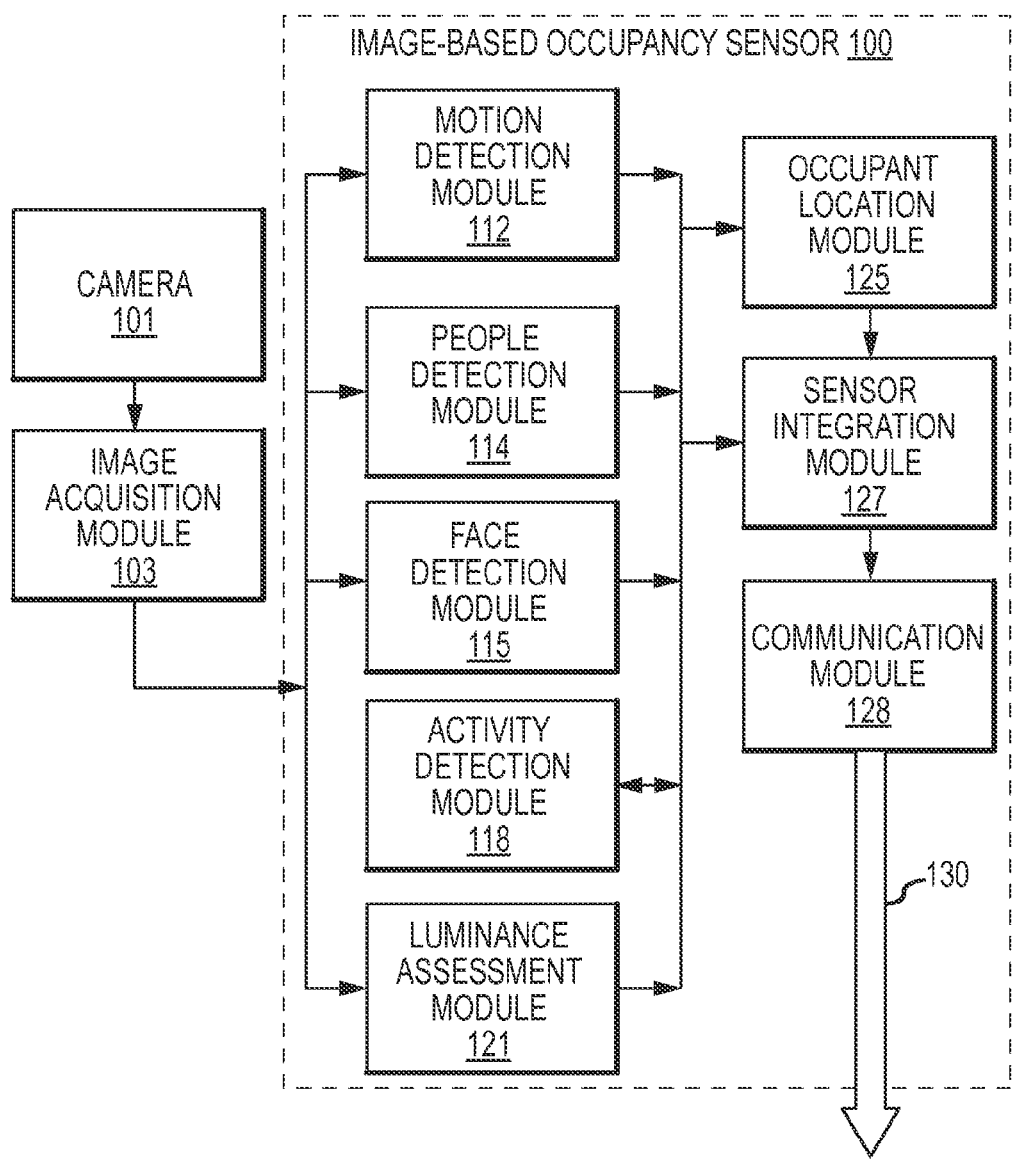
FIG. 1 shows an exemplary image-based occupancy sensor.
Figure 2:
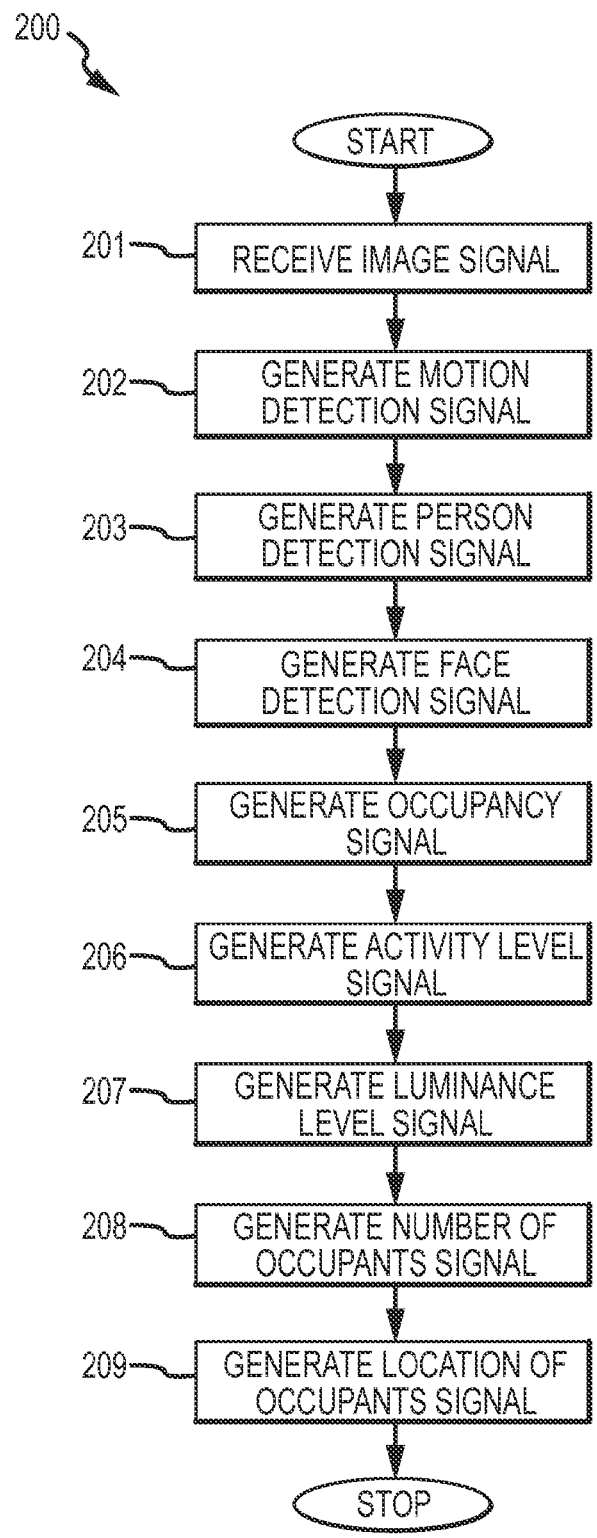
FIG. 2 is a flowchart of an exemplary image-based occupancy sensing method.

FIGS. 1-2 and the following description depict specific examples to teach those skilled in the art how to make and use the best mode of embodiments of a building energy analysis system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the disclosed exemplary implementations of a building energy analysis system. As a result, the embodiments described below are not limited to the specific examples described, but only by the claims and their equivalents.

FIG. 1 shows an exemplary image-based occupancy sensor 100. The image-based occupancy sensor 100 in some embodiments comprises a motion detection module 112, a people detection module 114, a face detection module 115, an activity detection module 118, and a luminance assessment module 121. The image-based occupancy sensor 100 further comprises an occupant location module 125, a sensor integration module 127, and a communication module 128.

The image-based occupancy sensor 100 may be coupled to and receive an image signal from a camera 101 and an image acquisition module 103. The camera 101 is positioned toward a monitored volume, wherein the image signal captures images of at least a portion of the monitored volume. The monitored volume may comprise an area, a room or part of a room, an enclosure, or any volume that is to be monitored.

Each of the motion detection module 112, the people detection module 114, and the face detection module 115 receive and process the image signal. Each of the motion detection module 112, the people detection module 114, and the face detection module 115 generate an occupancy signal. Each of the motion detection module 112, the people detection module 114, and the face detection module 115 generate a unique occupancy signal. The motion detection module 112 generates an occupancy signal comprising a motion detection signal that is based on detecting motion in the monitored volume. The people detection module 114 generates an occupancy signal comprising a people detection signal that is based on detecting one or more people in the monitored volume. The face detection module 115 generates an occupancy signal comprising a face detection signal that is based on detecting one or more faces in the monitored volume. The three signals are processed to generate a single occupancy signal.

At a minimum, the occupancy signal includes an occupied or vacant status for the monitored volume, along with a confidence level. The confidence level comprises a confidence in the accuracy of the occupancy signal. In addition, other occupancy information can be derived from the image signal and can be included in the output of the image-based occupancy sensor 100.

The camera 101 generates the image signal and provides the image signal to the image-based occupancy sensor 100. The camera 101 can comprise any suitable image-capturing device. The image signal can comprise an analog or digital signal. The image signal can comprise a sequence of image frames. In some embodiments, the image frames may comprise two-dimensional arrays of pixels.

The image acquisition module 103 is coupled to the camera 101. The image acquisition module 103 in some embodiments receives, stores, and relays the image frames of the image signal. The image frames may be separated by predetermined time intervals. For example, in some embodiments the image-based occupancy sensor 100 may receive image frames in the range of one to four frames per second. However, the frame rate may comprise other rate values and this example is given merely for illustration and not limitation. The image-based occupancy sensor 100 may use some or all image frames of the image signal.

In some embodiments, the image acquisition module 103 includes an image buffer that temporarily holds image frames. In some embodiments, the image acquisition module 103 comprises a circular buffer, wherein a newest image frame from the camera 101 over-writes the oldest image frame stored in the circular buffer. In such an embodiment, the image frames are transient and do not require long-term storage. The circular buffer structure ensures that only a limited working set of images are stored in memory, processed and subsequently deleted, to address both potential privacy concerns and storage requirements.

The image acquisition module 103 may simply relay the image signal. Alternatively, the image acquisition module 103 may perform processing on the image signal, such as digitization if the image signal comprises an analog image signal.

In some embodiments, the image acquisition module 103 may control the image capturing operations of the camera 101. The image acquisition module 103 may also keep the camera 101 operational and may be able to capture image frames. Alternatively, the image-based occupancy sensor 100 may control the image capturing operations of the camera 101 through the image acquisition module 103.

In the figure, the image acquisition module 103 is shown as being external to the image-based occupancy sensor 100. However, in alternative embodiments the image acquisition module 103 may comprise a component of the image-based occupancy sensor 100.

The motion detection module 112 receives the image signal and processes image frames to generate a motion detection signal. The motion detection module 112 may process some or all image frames of the image signal. The motion detection signal indicates a presence or absence of motion in the image frames.

The motion detection module 112 may detect motion in the image frame in any suitable manner. For example, the motion detection module 112 may detect motion by detecting relative motion of a set of pixels. In some embodiments, the motion detection module 112 computes image subtractions in order to eliminate stationary elements in the image frame. Such stationary elements may comprise building structures, furniture, fixtures, or equipment within the monitored volume, for example. The motion detection module 112 identifies moving areas in image frames. The motion detection module 112 tracks the moving areas to create motion history data for assessing the number of independent moving elements in the image frame, as well as individual and overall motion gradients. The motion history data and the motion gradients are used to determine an associated confidence level. The identified moving elements and the confidence level are included in the motion detection signal. However, other image-based motion detection methods can be employed and are within the scope of the description and claims.

The motion detection module 112 may process some or all of the regions or pixels of an image frame. Consequently, the motion detection module 112 may detect more than one occurrence of motion in an image frame or may process an image frame as multiple image regions.

The people detection module 114 receives the image signal and processes image frames to generate a people detection signal. The people detection module 114 may process some or all image frames of the image signal. The people detection signal indicates a presence or absence of people in the image frames.

The people detection module 114 may detect one or more people in the image frame in any suitable manner. For example, the people detection module 114 may detect one or more people by correlating pixels in the image frame to a general shape of a person. Alternatively, or in addition, the people detection module 114 may detect one or more people by correlating pixels to a general shape of a portion of a person, such as a head, arm, hand, et cetera. However, it should be understood that other image-based people detection methods can be employed and are within the scope of the description and claims.

In some embodiments, the people detection module 114 is based on an implementation of the histogram of oriented gradient (HOG) algorithm available from OpenCV (available at opencv.willowgarage.com). The people detection module 114 processes image frames to identify the presence of human body traits to infer occupancy with a 20 certain degree of confidence. Once people presence is detected, the people detection module 114 performs additional processing to determine relative occupant position, size, and count. The occupant position, size, and count, along with a confidence level estimate based on persistence of recognition over time, are incorporated into the people detection signal.

The people detection module 114 may process some or all of the regions or pixels of an image frame. Consequently, the people detection module 114 may detect multiple people in an image frame or may process an image frame as multiple image regions.

The face detection module 115 receives the image signal and processes image frames to generate a face detection signal. The face detection module 115 may process some or all image frames of the image signal. The people detection signal indicates a presence or absence of a face or faces in the image frames.

The face detection module 115 may detect a face or faces in the image frame in any suitable manner. For example, the face detection module 115 may detect a face or faces by correlating pixels to a general shape of a human face. Alternatively, or in addition, the face detection module 115 may detect a face or faces by correlating pixels in the image frame to a general shape of a portion of a human face, such as an eye (or eyes), nose, mouth, et cetera. However, it should be understood that other image-based face detection methods can be employed and are within the scope of the description and claims.

The face detection module 115 in some embodiments uses the Haar Cascade algorithm of the OpenCV library with training data for performing frontal face recognition. Once a face or faces are detected, the face detection module 115 may perform additional computations in order to determine positions and relative sizes of the detected face or faces. An occupancy certainty (i.e., confidence) level, which is based on the number of faces detected and the consistency of detection over time, may also be computed and included in the face detection signal.

The face detection module 115 may process some or all of the regions or pixels of an image frame. Consequently, the face detection module 115 may detect more than one face in an image frame or may process an image frame as multiple image regions.

The activity detection module 118 receives the motion detection signal from the motion detector module 112, receives the people detection signal from the people detection module 114, and receives the face detection signal from the face detection module 115. The activity detection module 118 processes these three signals and performs a basic assessment of occupant activity levels and generates an activity level signal. The activity detection module 118 may determine a number of pixels involved in the motion or activity. The activity level signal indicates an activity level of people detected in the image frame. The activity level signal may include a classification of active or inactive. The activity level determination can include a quantification of one or more of motion duration, motion amplitude, motion velocity, or a time between motion occurrences, for example. Other activity level characteristics are contemplated and are within the scope of the description and claims.

The activity level signal may convey a representative activity level, such as active and sedentary states or active and inactive states, for example. It should be understood that different and additional activity states may be included in the activity level signal and are within the scope of the description and claims.

In some embodiments of the image-based occupancy sensor 100, the activity detection module 118 processes the motion detection signal, the people detection signal, and the face detection signal and generates an activity level signal for the monitored volume using a predetermined motion weighting factor, a predetermined people weighting factor, and a predetermined face weighting factor. The combining can comprise a weighted sum operation wherein the weighting factors control how the motion detection signal, the people detection signal, and the face detection signal are combined to form the activity level signal.

In some embodiments, the activity level can be determined by the activity detection module 118 comparing detected motion to a predetermined activity threshold, for example. In other embodiments, the activity level can be determined by comparing detected motion to the predetermined activity threshold while taking into account the people detection signal and the face detection signal. The predetermined activity threshold can comprise any manner of threshold value or values, including an experimentally obtained threshold value or values.

The activity level signal may be used for various purposes. The activity level signal may be used in determining an appropriate level of lighting for the monitored volume and for controlling lights and lighting levels for the monitored volume. The activity level signal may be used in operating heating, ventilating, and air conditioning (HVAC) controls or systems for a building, room, area, or other monitored volume.

The luminance assessment module 121 receives the image signal and processes image frames to generate a luminance level signal. The luminance level signal indicates a luminance level in the image frames. The luminance level may comprise an average luminance level, a mean luminance level, or other representative luminance quantification for the image frames.

The luminance assessment module 121 may determine a luminance level in any suitable manner. In some embodiments, the image frames may be captured in a red-green-blue (RGB) format. The luminance assessment module 121 may transform and separate the RGB data into individual hue, saturation, and value (HSV) image components. The luminance assessment module 121 then may manipulate the "value" component with homomorphic filtering to extract an average illuminance level for the image frame. The luminance assessment module 121 transforms the average illuminance level into an assessed illuminance average through a simple regression fitting equation in order to generate the outputted luminance level signal. However, it should be understood that other image-based luminance quantification methods can be employed and are within the scope of the description and claims.

The luminance assessment module 121 may compare the luminance level to a predetermined minimum luminance threshold. If the luminance level does not exceed the predetermined minimum luminance threshold, then the luminance assessment module 121 may determine that the monitored volume (or an area of the monitored volume) is not illuminated or is not sufficiently illuminated for performing a specific activity.

In some embodiments, the activity detection module 118 and the luminance assessment module 121 may cooperate or share information and therefore may determine whether the monitored volume (or an area of the monitored volume) is sufficiently illuminated based on the current activity level as determined by the activity detection module 118. The dimming of lights in the monitored volume may therefore be based at least in part on the activity level.

In some embodiments, if the monitored volume is determined to be non-illuminated or not sufficiently illuminated, the image-based occupancy sensor 100 may activate a light source sufficient to perform occupancy detection. For example, the image-based occupancy sensor 100 may be configured to periodically activate an IR light source for occupancy detection if the monitored volume is non-illuminated. In other embodiments, the luminance assessment module 121 may compare the average illumination level to one or more minimum luminance thresholds and determine that the monitored volume (or an area of the monitored volume) is not sufficiently illuminated. The image-based occupancy sensor 100 may then generate a dimming level signal for activating a light source at one of several available discrete or continuous power levels for compensating the insufficient light level of the monitored volume (or area of the monitored volume).

The luminance assessment module 121 may process some or all image frames of the image signal. Further, the luminance assessment module 121 may process some or all pixels of an image frame. Consequently, the luminance assessment module 121 may generate a luminance level for one or more regions of the image frame or may process an image frame as multiple image regions.

The occupant location module 125 is coupled to the motion detection module 112, the people detection module 114, the face detection module 115, the activity detection module 118, and the luminance assessment module 121. The occupant location module 125 receives the motion detection signal, the people detection signal, the face detection signal, the activity level signal, and the luminance level signal. In some embodiments, the occupant location module 125 may process the people detection signal, the face detection signal, and the activity level signal to generate a number of occupants signal. The number of occupants signal indicates a number of people occupying the monitored volume. In addition, the occupant location module 125 may process the people detection signal, the face detection signal, and the activity level signal to generate an occupant location signal. The occupant location signal includes information on a physical location of one or more occupants within the field of view of the camera 101 in the monitored volume.

In some embodiments, the occupant location signal includes information on a distance from the camera 101 to the one or more occupants. In some embodiments, the occupant location signal includes information on a relative location of the one or more occupants within an image frame. For example, the location of occupants signal may include an approximate distance from the camera 101 to people detected within the monitored volume. The location of occupants signal may include distance values for any and all people detected within the monitored volume. The location of occupants signal may include directional values that indicate an approximate location of people within the monitored volume. The occupant location signal may include an angular position of an occupant or occupants with respect to a center of the image frame or camera view axis. However, it should be understood that any suitable position coordinates or coordinate system may be employed.

In some embodiments, the occupant location module 125 uses the people detection signal and the face detection signal to generate occupant locations. The occupant location module 125 in some embodiments may process and/or manipulate geometry information about faces and people locations to obtain approximate coordinates. The occupant location module 125 may estimate occupant locations by evaluating relative image sizes and angles in the image frames.

The sensor integration module 127 is coupled to the motion detection module 112, the people detection module 114, the face detection module 115, the activity detection module 118, the luminance assessment module 121, and the occupant location module 125. The sensor integration module 127 receives the motion detection signal, the people detection signal, the face detection signal, the activity level signal, the luminance level signal, and the occupant location signal. The sensor integration module 127 processes the motion detection signal, the people detection signal, and the face detection signal to generate the occupancy signal. The sensor integration module 127 processes the signals to create a composite occupancy/vacancy detection determination and outputs the composite occupancy/vacancy detection determination as the occupancy signal.

Each detection module generates an occupancy signal and a confidence level independently from the other detection modules. In general, the people detection module 114 may detect people while motion is detected or may detect people independently from motion. Similarly, the face detection module 115 may detect a face or faces while motion is detected or may detect faces independently from motion. As a result, an occupant may be detected while standing still in front of the camera 101.

The occupancy signal in some embodiments comprises a substantially real-time occupancy signal that changes substantially instantaneously with changes in actual occupancy in the monitored volume. Further, in some embodiments the composite occupancy/vacancy signal is calculated from the individual signals received from the detection modules and along with cumulative occupancy data representing past occupancy signals over time. Use of past occupancy signals may allow the suppression of momentarily erroneous signals, such as where a detection module incorrectly detects occupancy or vacancy for one or more image frames. Alternatively, or in addition, the sensor integration module 127 may prevent or delay sudden changes in occupancy status, such as by enforcing a hysteresis limitation. The cumulative occupancy variable may be constantly re-evaluated according to elapsed time and reported occupancy levels.

In addition to the composite occupancy signal, the sensor integration module 127 also generates an occupancy signal confidence level for the occupancy signal. The sensor integration module 127 creates the occupancy signal confidence level from the individual confidence levels received from the motion detection module 112, the people detection module 114, and the face detection module 115 in conjunction with the motion detection signal, the people detection signal, and the face detection signal. In some embodiments, the sensor integration module 127 generates the occupancy signal confidence level by averaging (or otherwise combining) the confidence levels received from the individual detection modules at each sampling time and according to weighting factors assigned to each detection module. The sensor integration module 127 outputs the occupancy/vacancy detection determination along with a composite certainty assessment (confidence) level, calculated using the individual confidence levels from the detection modules. The sensor integration module 127 outputs the occupancy signal (and confidence level) to the communication module 128.

The confidence level may be generated as part of generating the composite occupancy/vacancy information. In some embodiments, the confidence level may take into account an agreement or disagreement among the motion detection signal the people detection signal, and the face detection signal. In some embodiments, the confidence level may take into account an elapsed time between occupancy detections in the motion detection signal the people detection signal, and the face detection signal. In addition, in some embodiments the confidence level of the (composite) occupancy signal may take into account the individual confidence levels of the motion detection signal, the people detection signal, and the face detection signal.

In order to ensure high accuracy levels in the determination of occupancy, the sensor integration module 127 may generate an occupancy indication indicating vacancy or occupancy, with an occupancy indication specifying that one or more people are detected within the monitored volume. The sensor integration module 127 may generate the occupancy indication when the occupancy signal confidence level exceeds a predetermined minimum confidence threshold. If the occupancy signal confidence level does not exceed the predetermined minimum confidence threshold, then the sensor integration module 127 will generate a vacancy indication. As a result, the sensor integration module 127 may generate a real-time composite occupancy signal including an occupied state or status when at least one detection module is reporting occupancy and the occupancy signal confidence level exceeds the predetermined minimum confidence threshold.

In some embodiments, the sensor integration module 127 may receive the activity level signal from the activity detection module 118 and may optionally and additionally include activity level information in the outputted occupancy signal. Consequently, the outputted occupancy signal may include activity state information, as previously discussed.

In some embodiments, the sensor integration module 127 may receive the luminance level signal from the luminance assessment module 121 and may optionally and additionally include luminance level information in the outputted occupancy signal. In addition, the sensor integration module 127 may receive a dimming level information from the luminance assessment module 121. Consequently, the outputted occupancy signal may include luminance level information, as previously discussed.

In some embodiments, the sensor integration module 127 may receive the occupant location signal from the occupant location module 125 and may optionally and additionally include occupant location information in the outputted occupancy signal. Consequently, the outputted occupancy signal may include occupant location information and occupant position information, as previously discussed.

The communication module 128 is coupled to the sensor integration module 127 and receives the occupancy signal from the sensor integration module 127. The communication module 128 is further coupled to a communication link 130. The occupancy signal may be substantially continuously transmitted over the communication link 130, may be periodically transmitted, or may be transmitted as needed, such as when a change in information from the previous communication has occurred. The occupancy signal confidence level may accompany the occupancy signal.

The communication link 130 enables communication between the image-based occupancy sensor 100 and other devices. For example, the image-based occupancy sensor 100 may be coupled to a computer or controller that controls lighting for the monitored volume or for a building or facility that includes the monitored volume. The image-based occupancy sensor 100 may therefore be in communication with a computer, controller, or other device that regulates and/or optimizes lighting, performs daylighting or daylight harvesting (controlling lighting levels according to outside light levels), temperature, and ventilation control. A building or facility may include multiple image-based occupancy sensors 100 and multiple monitored volumes.

In some embodiments, the received occupancy signal may include occupancy information and a corresponding confidence level, as previously discussed. In some embodiments, the received occupancy signal may include occupancy information and a corresponding confidence level, and one or more of an activity level information, a luminance level information, a number of occupants within the monitored volume, and a location of occupants within the monitored volume, as previously discussed. The communication module 128 transmits the occupancy signal over the communication link 130.

In some embodiments, the communication module 128 may enable the image-based occupancy sensor 100 to communicate according to a predetermined communication protocol. The communication module 128 may process the occupancy signal and generate a communication signal for transmission over the communication link 130 according to the predetermined communication protocol.

In some embodiments, the communication module 128 enables the image-based occupancy sensor 100 to communicate according to a Building Automation and Control network (BACnet) communication protocol. The BACnet protocol allows communication of building automation and control systems for applications such as heating, ventilating, and air-conditioning control, lighting control, access control, and fire detection systems and associated equipment. However, it should be understood that other communication protocols are contemplated and are within the scope of the description and claims.

During operation of the image-based occupancy sensor 100 in some embodiments, the image-based occupancy sensor 100 receives an image signal of a monitored volume comprising a sequence of image frames, the motion detection module 112 processes the image signal to generate a motion detection signal, the people detection module 114 processes the image signal to generate a people detection signal, the face detection module 115 processes the image signal to generate a face detection signal, and the sensor integration module 127 receives the motion detection signal from the motion detection module 112, receives the people detection signal from the people detection module 114, receives the face detection signal from the face detection module 115, and generates an occupancy signal using the motion detection signal, the people detection signal, and the face detection signal, with the occupancy signal indicating whether one or more people are detected within the monitored volume.

In some embodiments of the image-based occupancy sensor 100, the sensor integration module 127 generates an occupancy signal confidence level of the occupancy determination. The occupancy signal confidence level is included in the occupancy signal.

In some embodiments of the image-based occupancy sensor 100, the motion detection signal may include a motion confidence level, the people detection signal may include a people confidence level, and the face detection signal may include a face confidence level, wherein the sensor integration module 127 generates an occupancy signal confidence level from a weighted sum of the motion confidence level, the people confidence level, and the face confidence level.

In some embodiments of the image-based occupancy sensor 100, the sensor integration module 127 generates an occupancy signal confidence level of the occupancy determination from a weighted sum of the motion confidence level, the people confidence level, and the face confidence level using a predetermined motion confidence weighting factor, a predetermined people confidence weighting factor, and a predetermined face confidence weighting factor.

In some embodiments of the image-based occupancy sensor 100, the predetermined motion confidence weighting factor is larger than the predetermined people confidence weighting factor or the predetermined face confidence weighting factor. For example, in some embodiments the motion detection confidence signal may be weighted at seventy (70) percent, the people detection confidence signal may be weighted at twenty (20) percent, and the face detection confidence signal may be weighted at ten (10) percent. In such an embodiment, the motion detection signal will have a large influence on whether a face detection signal is accepted or rejected. However, it should be understood that this example is merely illustrative and not limiting, and the weightings may be set at any predetermined amounts.

In some embodiments of the image-based occupancy sensor 100, the sensor integration module 127 generates an occupancy indication when the occupancy signal confidence level exceeds a predetermined minimum confidence threshold. If the occupancy signal confidence level does not exceed the predetermined minimum confidence threshold, then the sensor integration module 127 generates a vacancy indication.

In some embodiments of the image-based occupancy sensor 100, the activity detection module 118 processes the motion detection signal, the people detection signal, and the face detection signal and generates an activity level signal for the monitored volume.

In some embodiments of the image-based occupancy sensor 100, the activity detection module 118 processes the motion detection signal, the people detection signal, and the face detection signal and generates an activity level signal for the monitored volume using a predetermined motion weighting factor, a predetermined people weighting factor, and a predetermined face weighting factor.

In some embodiments of the image-based occupancy sensor 100, the luminance assessment module 121 processes the image signal and generates a luminance level signal for the monitored volume.

In some embodiments of the image-based occupancy sensor 100, the occupant location module 125 processes the motion detection signal, the people detection signal, and the face detection signal and generates a number of occupants signal for the monitored volume.

In some embodiments of the image-based occupancy sensor 100, the occupant location module 125 processes the motion detection signal, the people detection signal, and the face detection signal and generates a location of occupants signal for the monitored volume.

The image-based occupancy sensor and method can be used detect and signal occupancy in a monitored volume. The image-based occupancy sensor and method can be used for monitoring the occupancy of a building, room, or area. The image-based occupancy sensor and method can be used to provide one or more occupancy signals to a building supervisory system. The occupancy determination can be used for energy efficiency purposes, for example. The occupancy determination can be used for intelligent building operation based on detected occupancy of a monitored volume.

The image-based occupancy sensor and method can be used for controlling lighting of a building, room, or area according to a detected occupancy. The image-based occupancy sensor and method can be used for controlling the operation of a heating, ventilating, and air-conditioning (HVAC) system or other system of a building. However, additional uses for the image-based occupancy sensor are contemplated and are within the scope of the description and claims.

The image-based occupancy sensor and method can be used for activating or de-activating the lights of a monitored volume according to occupancy. The image-based occupancy sensor and method can be used for controlling the level or intensity of the lights (i.e., dimming) of a monitored volume according to occupancy.

The image-based occupancy sensor and method can be used for operating the lights of a monitored volume according to occupancy and according to an occupancy signal confidence level. The image-based occupancy sensor and method can be used for operating the lights of a monitored volume according to occupancy, an occupancy signal confidence level, and according to a luminance level in the monitored volume. The image-based occupancy sensor and method can be used for operating the lights of a monitored volume according to occupancy, an occupancy signal confidence level, and according to a number of occupants of the monitored volume. The image-based occupancy sensor and method can be used for operating the lights of a monitored volume according to occupancy, an occupancy signal confidence level, and according to a location of occupants within the monitored volume. The image-based occupancy sensor and method can be used for operating the lights of a monitored volume according to occupancy, an occupancy signal confidence level, and according to an activity level of occupants within the monitored volume. The image-based occupancy sensor and method can be used for operating the lights of a monitored volume according to occupancy, an occupancy signal confidence level, and according to one or more of a luminance level, a number of occupants, a location of occupants, and an activity level of occupants within the monitored volume.

FIG. 2 is a flowchart 200 of an exemplary image-based occupancy sensing method. In step 201, an image signal is received, such as the image signal received from the camera 101. The image signal can comprise a sequence of image frames, as previously discussed.

In step 202, an image frame of the image signal is processed by a motion detection routine of the motion detection module 112 to generate a motion detection signal, as previously discussed. The motion detection signal indicates a presence or absence of motion in the image frame. In addition, the motion detection signal may include a confidence level in some embodiments.

In step 203, the image frame of the image signal is processed with a people detection routine of the people detection module 114 to generate a people detection signal, as previously discussed. The people detection signal indicates a presence or absence of people in the image frame.

In step 204, the image frame of the image signal is processed with a face detection routine of the face detection module 115 to generate a face detection signal, as previously discussed. The face detection signal indicates a presence or absence of a face (or faces) in the image frame.

It should be understood that steps 202, 203, and 204 do not have to be identically processed. For example, the motion detection step may be performed more often than the people detection and/or the face detection, as motion detection may require a lesser time between processing occurrences than the people detection and/or the face detection. People detection and face detection may generate adequate and accurate results if done at intervals of one second, as an example, wherein motion detection may be more accurate and informative if processed at a higher rate, such as twice per second or four times per second, for example.

In step 205, an occupancy signal is generated from the motion detection signal, the people detection signal, and the face detection signal, as previously discussed. The occupancy signal indicates whether people are detected within the monitored volume. The occupancy signal therefore comprises a synthesis of the motion detection signal, the people detection signal, and the face detection signal.

The occupancy signal is accompanied by, or includes, a confidence level, as previously discussed. The confidence level comprises a confidence value for the occupancy signal. The confidence level reflects a confidence level of the occupancy determination. The confidence level is computed according to weighting factors assigned to the three signals. The confidence level changes according to various factors, including agreement between the detection modules, wherein the confidence level may decrease if the sensors do not agree.

In step 206, an activity level signal may be generated from the motion detection signal, the people detection signal, and the face detection signal, as previously discussed. The activity level signal may be optional. The activity level quantifies an activity level in the monitored volume.

In step 207, a luminance level signal may be generated from the image frames, as previously discussed. The luminance level signal may be optional. The luminance level signal quantifies a luminance level in the monitored volume. The luminance level comprises a representative luminance value that is computed from all or a portion of the image frame. The luminance level may comprise an average or mean luminance value that is computed from pixels of the image frame. The luminance level may alternatively comprise an integration of all or part of the image frame. However, it should be understood that the above description is not exhaustive and the luminance level may be generated in any desired manner.

In step 208, a number of occupants signal may be generated from the people detection signal, and the face detection signal, as previously discussed. The number of occupants signal may be optional. The number of occupants signal indicates a number of people occupying the monitored volume.

In step 209, a location of occupants signal may be generated from the people detection signal, and the face detection signal, as previously discussed. The location of occupants signal may be optional. The location of occupants signal indicates a position or positions of any occupants in the monitored volume.

The steps 201-209 may comprise elements of an image-based occupancy sensor software, wherein the steps 201-209 comprise a portion of a processing loop. The steps 201-209 are iteratively executed in some embodiments. It should be understood that some or all of the steps 201-209 may be executed on each iteration of a processing loop.

It should be understood that the modules of FIG. 1 are for illustrative purposes only and do not limit the image-based occupancy sensor 100 to any particular configuration, to any particular division of tasks, or to any particular signaling flow. In some embodiments, the image-based occupancy sensor 100 can comprise a specialized circuit that receives the image signal as described above and output the various occupancy signals and occupancy information. In other embodiments, the image-based occupancy sensor 100 can comprise a chip or monolithic device including at least the modules and/or functions depicted in FIG. 1. The chip can be manufactured or configured to receive the image signal as described above and output the various occupancy signals and occupancy information. In yet other embodiments, the image-based occupancy sensor 100 can comprise a computer executing software for performing the image-based occupancy sensing method depicted in FIG. 2. The computer can comprise a system formed of multiple components that receive the image signal as described above and output the various occupancy signals and occupancy information.

Accordingly, means available to practice various embodiments described herein may include, but are not limited to, digital computer systems, microprocessors, application-specific integrated circuits (ASICs), general purpose computers, programmable controllers and field programmable gate arrays (FPGAs), all of which may be generically referred to herein as "processors." For example, in one embodiment, signal processing may be incorporated by an FPGA or an ASIC, or alternatively by an embedded or discrete processor. Therefore, other embodiments of the present invention are program instructions resident on computer readable media which when implemented by such means enable them to implement various embodiments. Computer readable media include any form of a non-transient physical computer memory device. Examples of such a physical computer memory device include, but are not limited to, punch cards, magnetic disks or tapes, optical data storage systems, flash read-only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) language or Hardware Description Language (VHDL).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. An image-based occupancy sensor, comprising:
   a motion detection module that receives an image signal of a monitored volume comprising a sequence of image frames and processes the image signal to generate a motion detection signal;
   a people detection module that receives the image signal and processes the image signal to generate a people detection signal;
   a face detection module that receives the image signal and processes the image signal to generate a face detection signal; and
   a sensor integration module that receives the motion detection signal, the people detection signal, and the face detection signal, and generates an occupancy signal using the motion detection signal, the people detection signal, and the face detection signal, wherein the occupancy signal corresponds to an occupancy determination indicating vacancy or occupancy, wherein the occupancy determination indicating occupancy corresponds to the detection of one or more people within the monitored volume.

2. The image-based occupancy sensor of claim 1, wherein the sensor integration module generates an occupancy signal confidence level of the occupancy determination, with the occupancy signal confidence level accompanying the occupancy signal.

3. The image-based occupancy sensor of claim 1, with the motion detection signal including a motion confidence level, with the people detection signal including a people confidence level, and with the face detection signal including a face confidence level, and wherein the sensor integration module generates an occupancy signal confidence level from a weighted sum of the motion confidence level, the people confidence level, and the face confidence level, with the occupancy signal confidence level accompanying the occupancy signal.

4. The image-based occupancy sensor of claim 1, with the motion detection signal including a motion confidence level, with the people detection signal including a people confidence level, and with the face detection signal including a face confidence level, and wherein the sensor integration module generates an occupancy signal confidence level of the occupancy determination from a weighted sum of the motion confidence level, the people confidence level, and the face confidence level using a predetermined motion confidence weighting factor, a predetermined people confidence weighting factor, and a predetermined face confidence weighting factor, with the occupancy signal confidence level accompanying the occupancy signal.

5. The image-based occupancy sensor of claim 1, with the motion detection signal including a motion confidence level, with the people detection signal including a people confidence level, and with the face detection signal including a face confidence level, and wherein the sensor integration module generates an occupancy signal confidence level of the occupancy determination from a weighted sum of the motion confidence level, the people confidence level, and the face confidence level using a predetermined motion confidence weighting factor, a predetermined people confidence weighting factor, and a predetermined face confidence weighting factor, wherein the predetermined motion confidence weighting factor is larger than the predetermined people confidence weighting factor or the predetermined face confidence weighting factor, with the occupancy signal confidence level accompanying the occupancy signal.

6. The image-based occupancy sensor of claim 1, further comprising an activity detection module that processes the motion detection signal, the people detection signal, and the face detection signal and generates an activity level signal for the monitored volume.

7. The image-based occupancy sensor of claim 1, further comprising an activity detection module that processes the motion detection signal, the people detection signal, and the face detection signal and generates an activity level signal for the monitored volume using a predetermined motion weighting factor, a predetermined people weighting factor, and a predetermined face weighting factor.

8. The image-based occupancy sensor of claim 1, further comprising a luminance assessment module that processes the image signal and generates a luminance level signal for the monitored volume.

9. The image-based occupancy sensor of claim 1, further comprising an occupant location module that processes the people detection signal, and the face detection signal and generates a number of occupants signal for the monitored volume.

10. The image-based occupancy sensor of claim 1, further comprising an occupant location module that processes the people detection signal, and the face detection signal and generates a location of occupants signal for the monitored volume.

11. An image-based occupancy sensing method, with the method comprising:
receiving an image signal of a monitored volume comprising a sequence of image frames;
processing the image signal with a motion detection routine and generating a motion detection signal that indicates a presence or absence of motion in the image signal;
processing the image signal with a people detection routine and generating a people detection signal that indicates a presence or absence of one or more people in the image signal;
processing the image signal with a face detection routine and generating a face detection signal that indicates a presence or absence of one or more faces in the image signal; and
generating an occupancy signal that corresponds to an occupancy determination that indicates vacancy or occupancy using the motion detection signal, the people detection signal, and the face detection signal, wherein the occupancy determination indicating occupancy specifies that one or more people are occupying the monitored volume.

12. The method of claim 11, further comprising generating an occupancy signal confidence level of the occupancy determination, with the occupancy signal confidence level accompanying the occupancy signal.

13. The method of claim 11, with the motion detection signal including a motion confidence level, with the people detection signal including a people confidence level, and with the face detection signal including a face confidence level, and wherein an occupancy signal confidence level of the occupancy determination is generated from a weighted sum of the motion confidence level, the people confidence level, and the face confidence level, with the occupancy signal confidence level accompanying the occupancy signal.

14. The method of claim 11, with the motion detection signal including a motion confidence level, with the people detection signal including a people confidence level, and with the face detection signal including a face confidence level, and wherein an occupancy signal confidence level of the occupancy determination is generated from a weighted sum of the motion confidence level, the people confidence level, and the face confidence level using a predetermined motion confidence weighting factor, a predetermined people confidence weighting factor, and a predetermined face confidence weighting factor, with the occupancy signal confidence level accompanying the occupancy signal.

15. The method of claim 11, with the motion detection signal including a motion confidence level, with the people detection signal including a people confidence level, and with the face detection signal including a face confidence level, and wherein an occupancy signal confidence level of the occupancy determination is generated from a weighted sum of the motion confidence level, the people confidence level, and the face confidence level using a predetermined motion confidence weighting factor, a predetermined people confidence weighting factor, and a predetermined face confidence weighting factor, wherein the predetermined motion confidence weighting factor is larger than the predetermined people confidence weighting factor or the predetermined face confidence weighting factor, with the occupancy signal confidence level accompanying the occupancy signal.

16. The method of claim 11, further comprising processing the motion detection signal, the people detection signal, and the face detection signal with an activity detection routine and generating an activity level signal for the monitored volume.

17. The method of claim 11, further comprising processing the motion detection signal, the people detection signal, and the face detection signal with an activity detection routine and generating an activity level signal for the monitored volume using a predetermined motion weighting factor, a predetermined people weighting factor, and a predetermined face weighting factor.

18. The method of claim 11, further comprising processing the image signal and generating a luminance level signal for the monitored volume.

19. The method of claim 11, further comprising processing the people detection signal, and the face detection signal and generating a number of occupants signal for the monitored volume.

20. The method of claim 11, further comprising processing the people detection signal, and the face detection signal and generating a location of occupants signal for the monitored volume.

* * * * *